US011057659B2

(12) United States Patent
Vinson et al.

(10) Patent No.: US 11,057,659 B2
(45) Date of Patent: Jul. 6, 2021

(54) DETERMINISTIC HOUSEHOLD ASSIGNMENT MODEL (71) Applicant: comScore, Inc., Reston, VA (US)

(72) Inventors: Michael J. Vinson, Piedmont, CA (US); Frank Pecjak, Fairfax, VA (US); John Clougherty, Vienna, VA (US); Josh Chasin, New York, NY (US); Cameron Meierhoefer, Washington, DC (US)

(73) Assignee: Comscore, Inc., Reston, VA (US)

( * ) Notice: Subject to any disclaimer, the term of this patent is extended or adjusted under 35 U.S.C. 154(b) by 0 days.

(21) Appl. No.: 16/035,517

(22) Filed: Jul. 13, 2018

(65) Prior Publication Data
US 2019/0116391 A1  Apr. 18, 2019

Related U.S. Application Data (60) Provisional application No. 62/571,823, filed on Oct. 13, 2017.

(51) Int. Cl.
H04N 7/025 (2006.01)
H04N 21/258 (2011.01)
G06Q 30/02 (2012.01)
H04H 60/45 (2008.01)
H04H 60/52 (2008.01)

(52) U.S. Cl.
CPC ... *H04N 21/25883* (2013.01); *G06Q 30/0201* (2013.01); *G06Q 30/0242* (2013.01); *H04H 60/45* (2013.01); *H04H 60/52* (2013.01)

(58) Field of Classification Search
CPC ......... H04N 21/25883; G06Q 30/0201; G06Q 30/0242; H04H 60/52
See application file for complete search history.

(56) References Cited

U.S. PATENT DOCUMENTS

2010/0114668 A1   5/2010 Klein et al.
2013/0198125 A1 * 8/2013 Oliver .................. G06N 5/02
                                                706/46

(Continued)

OTHER PUBLICATIONS

International Search Report and Written Opinion issued in PCT/US2018/055580, dated Dec. 17, 2018.

Primary Examiner — Mulugeta Mengesha
(74) Attorney, Agent, or Firm — BakerHostetler (57) ABSTRACT Techniques for projecting household-level viewing events are described herein. Population data may be accessed including classes of a plurality of demographic attributes for households in a market. Representative household units (RHUs) may be generated, and the RHUs may be assigned a class for each of the demographic attributes and a quota based on the demographic attributes of a plurality of panelist households. Each of the panelist households may be assigned to one of the RHUs based on at least one panelist classes matching the classes for respective demographic attributes of the RHU, and the number of matching panelist households assigned to each of the RHU may be based on the quota. Panelist viewing data representing viewing events associated with the panelist household may be accessed. A report may be generated with the classes of the RHUs and the panelist viewing data of the assigned panelist households.

16 Claims, 6 Drawing Sheets (56) References Cited

U.S. PATENT DOCUMENTS

2014/0325057 A1* 10/2014 Borawski ........... H04N 21/4667
                                                                    709/224
2015/0262201 A1   9/2015 Rao et al.
2016/0165277 A1*  6/2016 Kirillov ............... H04N 21/251
                                                                    725/14
2016/0269783 A1*  9/2016 Mowrer ........... H04N 21/42203
2017/0006342 A1   1/2017 Nagaraja Rao et al.
2017/0064411 A1   3/2017 Goli et al.
2017/0091656 A1*  3/2017 Sheppard ............... G06Q 10/00
2017/0228795 A1   8/2017 Papakostas et al.

* cited by examiner

DETERMINISTIC HOUSEHOLD ASSIGNMENT MODEL

CROSS REFERENCE TO RELATED APPLICATIONS

This application claims the benefit of U.S. Provisional Patent App. No. 62/571,823, filed Oct. 13, 2017, the disclosure of which is hereby incorporated by reference herein.

TECHNICAL FIELD

The present disclosure generally relates to systems and methods for determining program viewership, and more particularly to systems and methods for determining the demographics of viewers of programs using deterministic household assignment.

BACKGROUND

Advertising relies on program and network viewership data in order to determine the reach and impressions of targeted advertisement. Advertisers are interested in numbers of viewers as well as the demographics of viewers in order to effectively manage advertising timing and content. Understanding audience viewing and habits may be useful in supporting planning, buying, and selling advertising.

Therefore, there is a need for improved systems and methods for determining the demographics of viewers of content using deterministic household assignment.

SUMMARY

Techniques for projecting household-level viewing events are described herein. Initially, population data may be accessed including classes of a plurality of demographic attributes for households in a market. An array of representative household units (RHUs) may be generated, and the RHUs may be assigned a class for each of the demographic attributes and a quota based on the demographic attributes of the population data. A panelist class may be accessed for each of the demographic attributes of a plurality of panelist households. Each of the panelist households may be assigned to one of the RHUs based on at least one of the panelist classes matching the classes for respective demographic attributes of the RHU, and the number of matching panelist households assigned to each of the RHU may be based on the quota. Panelist viewing data representing viewing events associated with the panelist household may be accessed. A report may be generated with the classes of the RHUs and the panelist viewing data of the assigned panelist households.

In some embodiments, assigning the panelist households to one of the RHUs may be based on each of the panelist classes matching the classes for the respective demographic attributes of the RHU. In some embodiments, the panelist viewing data may include an identification of a displayed media, advertisement, website, app, network and/or program and a time duration of the viewing event. In some embodiments, the viewing event may be displayed on one or more of a television, a mobile phone, a tablet, a laptop computer, a desktop computer, smart appliances, and a smart watch. In some embodiments, the demographic attributes may include one or more of a television stratum, a presence of a DVR, and a number of television sets.

In some embodiments, the demographic attributes may include one or more of an age of at least one member of the household, a race of at least one member of the household, an ethnicity of at least one member of the household, and an education level of at least one member of the household. In some embodiments, the demographic attributes may include one or more of an income of the household, a language spoken in the household, a number of members of the household, and a number of children of the household.

In some embodiments, the instructions, when executed, may further cause the at least one processor to determine that the panelist households are active based on viewing data accessed from a predetermined period of time, wherein only active panelist households are assigned to the RHUs. In some embodiments, the instructions, when executed, may further cause the at least one processor to generate the quota based on the number of households with the demographic attributes of the RHU relative to the number of households in the market. In some embodiments, the instructions, when executed, may further cause the at least one processor to stop assigning panelists households to an RHU based on the number of matching panelist households meeting the quota of the RHU.

In some embodiments, the instructions, when executed, may further cause the at least one processor to duplicate viewing data of the panelists households for an RHU based on the number of matching panelist households assigned to the RHU being less than the quota after the plurality of panelist households are assigned. In some embodiments, the population data may be received from one or more of a credit bureau and a census bureau. In some embodiments, the instructions, when executed, may further cause the at least one processor to receive a known value of viewing data for the market, and adapt the panelist viewing data for at least one of the RHUs based on the known value of the viewing data. In some embodiments, the instructions, when executed, may further cause the at least one processor to receive second population data for at least one second market, and scale the panelist viewing data for at least one of the RHUs of the market based on a relative size of the population data compared to the second population data.

The assignment of the panelist households may be based on first and second demographic attributes. The RHUs may be assigned a class for each of the first and second demographic attributes. Panelist classes of the first and second demographic attributes for a first panelist household may be matched to the respective classes of the first and second demographic attributes for a first RHU. The first panelist class may then be assigned to the first RHU. The panelist classes of the first and second demographic attributes for a second panelist household may be determined to not match the respective classes of the first and second demographic attributes for any RHU.

The panelist class of the first demographic attribute for the second panelist household may be matched to the class of the first demographic attribute for the first RHU. The second panelist household may then be assigned to the first RHU. The report may be generated including the classes of the first RHU and the panelist viewing data of the first and second panelist households.

In some embodiments, the first demographic attribute may include one or more of an income of the household, a language spoken in the household, a number of members of the household, and a number of children of the household. In some embodiments, the second demographic attribute may include one or more of an age of at least one member of the household, a gender of at least one member of the household, a race of at least one member of the household, and an education level of at least one member of the household.

In some embodiments, the population data may include classes for a third demographic attributes of the households in the market, the RHUs may be each assigned a class for the third demographic attribute. A panelist class for each of the first, second, and third demographic attributes may be accessed for a third panelist household. Accordingly, the instructions, when executed, may further cause the at least one processor to: determine that the panelist classes of the first, second, and third demographic attributes for the third panelist household do not match the respective classes of the first, second, and third demographic attributes for any RHU; determine that the panelist classes of the first and second demographic attributes for the third panelist household do not match the respective classes of the first and second demographic attributes for any RHU; match the panelist class of the first demographic attribute for the third panelist household to the class of the first RHU for the first demographic attribute; and assign the third panelist household to the first RHU. In some embodiments, the third demographic attribute may include a number of television sets.

Embodiments of any of the described techniques may include a method or process, an apparatus, a device, a machine, a system, or instructions stored on a computer-readable storage device. The details of particular embodiments are set forth in the accompanying drawings and description below. Other features will be apparent from the following description, including the drawings, and the claims.

DETAILED DESCRIPTION

The methodology involves creating an array of Representative Household Units (RHUs), demographically and behaviorally balanced to represent a geographic market. These RHUs may become the recipient dataset into which disparate donor datasets are assigned. The RHUs may be proportional to the overall geographic market (e.g., a ratio of 1 per 10 households in the market) and assigned demographic and/or behavior characteristics of the market at large. The behavior and/or demographic characteristics of the market can be established from population data received over a network from a trusted third party, such as data from one or more census bureaus and/or credit bureaus. The population data may provide invaluable granular data on the general make-up of a market at scale, but viewership data at the market-scale is often incomplete and/or inaccurate.

Therefore, real data from different datasets at a smaller scale (e.g., household-scale, person-scale, and/or device-scale) may be incorporated. The real data may be obtained from content viewed on devices, such as televisions (TVs), tablets, mobile phones, and/or other electronic devices. The viewing data may be accessed from "panelist households" who, in at least some cases, have agreed to have their viewing behavior actively and/or passively, directly monitored. For example, television viewership of the panelist household may be measured by a set-top-box (STB) logging viewing activity. Due to the direct access to the STB, the viewing data may provide a rich dataset accurately detailing viewing events of the members of the panelist households. The viewing data and/or panelist households may also be maintained current by providing a threshold of activity. For example, only panelist households with viewing data within the past 30 or 60 days may be assigned to the RHUs. The viewing data may also incorporate other devices (e.g., an iPad) associated with the panelist household by connecting to a household network router. The panelist viewing data may further include viewing data of devices (e.g. mobile phones) that are registered to a member of the panelist household and accessed data through a cellular network. The panelist viewing data may include return path data (RPD), which is a passive data collection technique that collects any user/viewer activity collected from a device defined by a start time and a duration. The panelist viewing data provides a rich-set of data of the media that real individuals are consuming. However, since the panelist viewing data is mainly received from a self-selecting population (panelists), the panelist viewing data itself does not provide an indication of viewing data of an overall geographic market.

Household data may also be maintained and include demographic attributes for each of the panelist households and associated members, such as household income, number of members of the household, the gender of the members, the age of the members, and strata of television access. The demographic attributes from the panelist households may be mapped to the RHUs of the population data to populate the RHUs with real panelist households. The viewing data of the panelist households may be assigned to the RHUs based on matching demographic attributes, such that actual viewing data from a real household may be assigned to a demographically, behaviorally matched RHU. Therefore, the viewing data of the panelist households may be proportionally calibrated to accurately represent the market population.

To maintain the demographic make-up of the market, each of the RHUs may be assigned a quota based on the overall population of the market. For example, if, according to the population data, households of two members (Male aged 25-34 years old; Female aged 25-34 years old) have a higher population than households of one member (Male aged 25-34 years old), RHUs of the first households may be assigned a proportionally higher quota than the RHUs of the second households. Assignment of the panelist households to the RHUs may be repeated until the respective quota is reached and stopped after the quota is reached, while the remaining RHUs may be populated until the respective quota is reached.

Perfect matches between the panelist households to the RHUs may be prioritized. However, some degree of inference and ascription may be required during the assignment phase in cases where either (1) there are not enough exact matches for the RHUs and/or (2) the raw unit assigned is not behaviorally complete (e.g., the donor household doesn't have as many set top box devices as have been designated for the RHU; or if DVR records are absent). In these cases, the match may be constrained to as many demographics and attributes as available, and the best remaining raw record may be assigned based on closest distance behaviorally. Assignments made to a particular RHU may be maintained if the raw input is still available (e.g., not attributed in the data set). This maintains longitudinal consistency in behavioral profiles. The goal of the assignment process is to achieve most of the target unique visitation and additive totals directly without additional allocations or adjustments (the target is 85% of market-network-day hours for TV). When the data is insufficient for the RHUs, matching of panelist households may be relaxed by removing certain demographic attributes from the requirements of being assigned to an RHU. The core demographic attributes may be prioritized to maintain the integrity of the core demographic definition of the RHU. For example, one or more device attributes (e.g., number of devices) may be relaxed first, one or more member attributes (e.g., age of the members, race of the members, and/or education level of the members) may be relaxed second, and one or more household attributes (e.g., income of the household, language spoken in the household, number of members, and/or number of children) may be relaxed third. In some embodiments, if RHUs do not have sufficient matches of panelist households to reach the quota, viewing data of previously assigned panelist households may be duplicated to ensure that the panelist viewing data of the RHUs is correctly proportional.

After assignment of the panelist households to the RHUs, viewing data received directly from the panelist households may be readily assigned to the respective RHU. The result is a massive respondent-level dataset that projects back to universe, matches individual currency measures from component data sets. Reports may be generated from the data and displayed to provide an accurate measure of demographic-based viewing data for the overall market to the content providers, advertisers, and others. The reports may therefore be used to estimate the number of viewing people and/or households of a particular demographic for a particular program, advertisement, sporting event, and/or other content item.

The resultant dataset and reports may further be adapted based on available known and trusted reported results from third parties. For example, the system may compare the projected assigned viewing data and additives to the individual platform targets (e.g., available as either census totals or a combination of census and enumeration) and may assign individual events into the appropriate RHUs to hit the targets. This assures that the projected results in the system match individual-currency reported results. The added events may be actual events from the pool of previously unassigned activity. The specific rules and targets for triggering the adaptive process may be determined by the individual platforms but generally an incremental event may be added to an RHU that shows a high propensity for the type of event and has a gap in activity that can accept the event. The result of the adaptive process is an individual respondent level profile that is empirically valid and the aggregation of those profiles achieves the core platform targets (e.g., market-network-day hours for TV). This adaptive process may be run daily and does not guarantee longitudinal consistency of assignment of events across RHUs or raw households (that is, a representative RHU is not guaranteed to get an adaptive event every day, nor will it get an event from the same source household/person/device every day).

Figure 1:
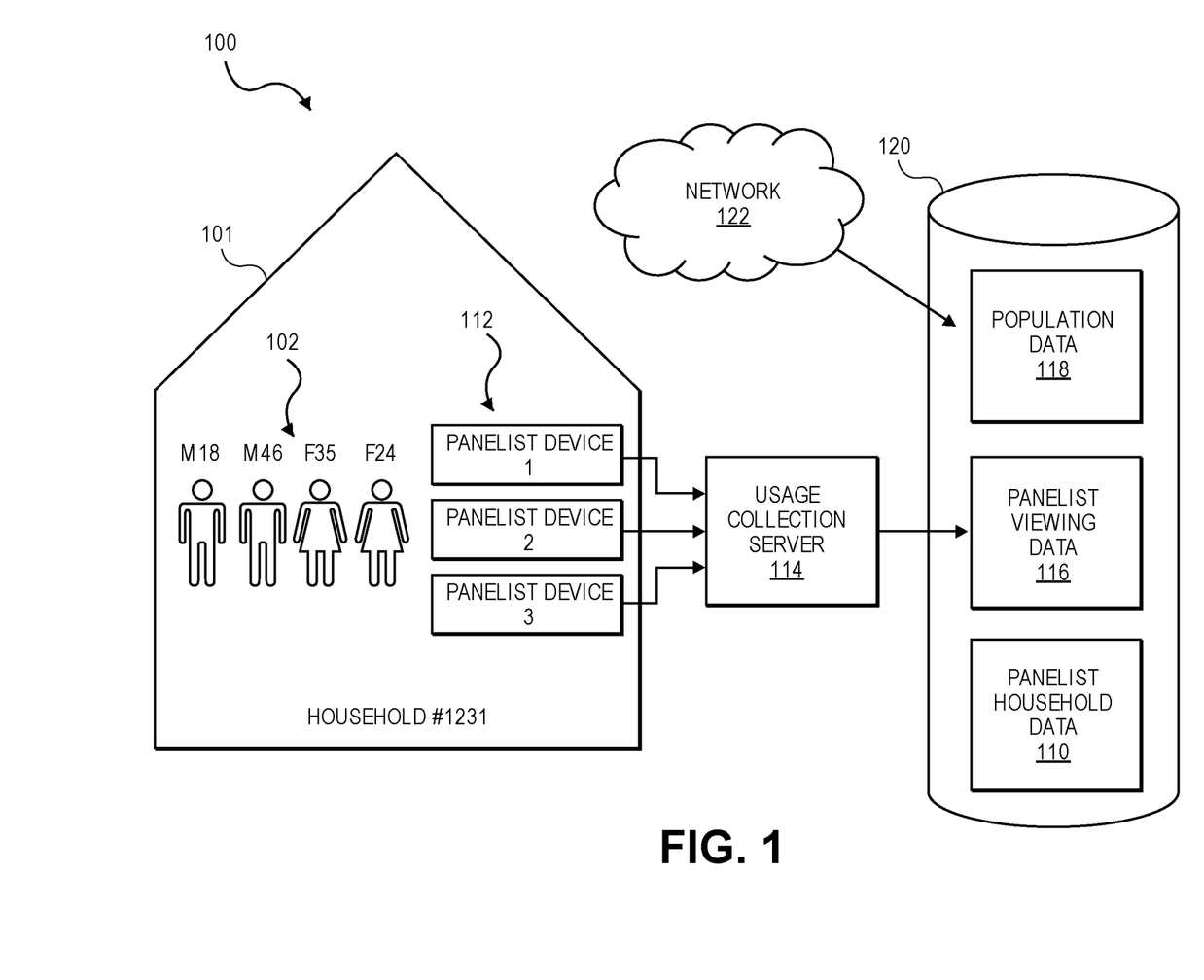
FIG. 1 illustrates an exemplary system in which viewership information may be collected and processed to determine and/or estimate panelist viewing data and assign panelist households.

FIG. 1 illustrates an example of a system 100 in which viewership information may be collected and processed to determine and/or estimate audience measurement data. The system 100 may include a number of panelist households 101, such as the illustrated panelist household assigned the Identification Number 1231. The panelist households 101 may include one or more panelist devices 112 for viewing content by one or more members 102. The panelist devices 112 may be embodied by and/or be connected with any number of a television, a mobile phone, a tablet, a laptop computer, a desktop computer, smart appliances, and/or a smart watch. For example, the panelist device 112 may include a number of different types of devices associated with the panelists household 101, such as a television in the household 101, a digital video recorder (DVR) connected to the television, a set-top-box (STB) associated connected to the television, and/or a home network router.

The panelist devices 112 may record panelist viewing data 116 for viewing events displayed on the panelist devices 112 or an associated display. The viewing event may indicate a media, an advertisement, a website, an app, a network and/or a program transmitted to the panelist device 112, and/or a time duration that the panelist household 101 was exposed to the media, an advertisement, a website, an app, a network and/or a program. The panelist devices 112 may report the panelist viewing data 116 to a usage collection server 114, and the panelist viewing data 116 may be stored in a storage device 120. In addition to viewing events, the panelist viewing data 116 may include data corresponding to the panelist household 101, the panelist device 112, stream control data, data representing content recorded by the panelist device 112, programs ordered on the panelist device 112 through an on demand service, and/or data about when the panelist device 112 was turned on or off. Other data about the status of the panelist device 112 and user interaction with the panelist device 112 may also be recorded and included in the panelist viewing data 116.

In some embodiments, the panelist devices 112 may include an STB that transmits television programs to a display (e.g., a television) from various stratum, such as over the air (OTA), direct broadcast satellite (DBS), cable, and/or telephone companies (telco). Thus, the panelist viewing data 116 may include tuning data recorded by the STB indicating media, advertisements, website, app, network and/or program being transmitted to the television and a time duration. The panelist devices 112 may also include a household network router of the panelist household 101 that monitors access of a network (e.g., the Internet) by computers, smart phones, and/or tablets in the household 101. The household router may monitor viewing events of the household 101 and report panelist viewing data 116 to the usage collection server 114. The panelist devices 112 may further include portable devices (e.g., mobile phones) physically located outside of the panelist household 101. Such a panelist device 112 may be associated with the panelist household 101 by being registered to one of the members 102, and the panelist device 112 may monitor viewing events on the panelist device 112 and report panelist viewing data 116 to the usage collection server 114.

In some embodiments, the panelist devices 112 may, additionally or alternatively, generate panelist viewing data 116 by monitoring media viewed by the member 102 while carrying the panelist device 112. For example, the panelist device 112 may include a microphone to capture and analyze ambient audio information to determine a likelihood that the member 102 is watching a particular television program. In some cases, the panelist device 112 may extract encoded signals from the sound information identifying the particular television program being watched by the member 102. The panelist device 112 may also identify the particular television program from the sound information using other mechanisms, such as, for example, by generating acoustic fingerprint from the sound information in querying a storage device mapping known acoustic fingerprints to television programs. In some embodiments, the panelist device 112 may monitor other types of information to determine a television program being watched by the member 102, such as, for example, video information, radio frequency (RF) signals, infrared (IR) signals, or other information. The panelist viewing data 116 generated from the panelist devices 112 in this manner may be saved associated with the panelist household 101 and/or member 102 associated with the panelist device 112.

The panelist devices 112 may produce panelist viewing data 116 representing viewing activity by the members 102. In some embodiments, the panelist device 112 may provide panelist viewing data 116 directly to the storage device 120. The panelist devices 112 may, additionally or alternatively, provide the panelist viewing data 116 to a separate collection server or set of servers, and the panelist viewing data 116 may be acquired by or otherwise stored in the storage device 120. In some embodiments, the panelist viewing data 116 may include information regarding television viewing events, such as, for example, a television program being watched, a television network, an entity operating the television network, a start time and stop time for the television viewing event, an identifier of the member 102 associated with the television viewing event, and/or other information.

The members 102 may be associated with demographics, such as age, gender, race, ethnicity, income, education level, and these demographics may be collected and stored in the storage device 120 or another storage as panelist household data 110. In the example illustrated in FIG. 1, the panelist household 101 includes four members 102: an 18-year-old male, a 24-year-old female, a 35-year-old female, and a 46-year-old male. The specific age and/or gender of the members 102 may be stored in panelist household data 110. The demographic attributes of the members 102 may, additionally or alternatively, be associated with demographic panelist classes. For example, each member 102 may be associated with one of a panelist class for age (e.g., 18-24, 25-34, 35-44, 45-54, 55-64, or 65+), rather than a specific age. This information may also be stored in the panelist household data 110. Other demographic attributes of the members 102 may be collected, such as occupation, income, race and/or ethnicity. Similarly, these demographic attributes may be saved to the panelist household data 110 based on a plurality of panelist classes (e.g., income of $0-$25,000, $25,001-$50,000, $51,000-$75,000, $75,001-$100,000 . . . $300,000+).

The demographic attributes of individual members 102 of the household 101 may be aggregated into household demographic attributes and associated panelist classes, which are stored in the panelist household data 110. For example, the income of the members 102 may be aggregated to determine a household income. Additional household demographic attributes may be a language spoken in the household 101, a number of members 102 of the household 101, and a number of children of the household 101, and panelist classes may be generated for each of the household demographic attributes. In addition, a geographic area or location for the panelist household 101 may be stored in the panelist household data 110. The geographic area or location for the panelist household 101 may be saved according to a geographic market (e.g., one of 210 Designated Market Areas (DMAs) assigned by Nielsen). The panelist household data 110 may further include device demographic attributes, for example, one or more of a television stratum, a presence of a digital video recorder (DVR), a number of television sets of the households 101, and types of the panelist devices 112 associated with the household 101.

The demographic information for the household members 102 and/or panelist households 101 may be collected in a number of ways. For example, the panelist households 101 may be recruited to be part of a television viewing panel that is used to provide panelist viewing data 116. Once the panelist household 101 is recruited, the demographic information may be collected as part of a registration process. In another example, the panelist household 101 may be a part of, or recruited into, an Internet usage panel that is used to provide Internet usage data. Demographic information of the household members 102 may be collected when the panelist household 101 is registered to be part of the Internet usage panel. As part of the Internet usage panel, the panelist household 101 may have a panel application installed on one or more of the panelist devices 112 in the panelist household 101. The panel application may collect television and/or internet usage data to send to the usage collection server 114. In some embodiments, the internet usage data could be used to infer information about household member 102, such as by comparing internet content accessed by each member 102 with demographic or other information about users accessing the same content. Other methods may be used to capture or confirm information about members 102 of the panelist household 101, such as survey data or data captured from other household behaviors, or data provided by third party services that attempt to determine demographic data of household members 102.

The storage device 120 may further receive population data 118 over a network 122. The population data 118 may be received from one or more trusted third party sources, such as one or more census bureaus and/or credit bureaus. The population data 118 may include demographic data (e.g., age, gender, ethnicity, race, and/or income) of constituents of households of a market. The population data 118 may also include residential information for the constituents, such as information on a male, aged 35 with an income of $35 k, and living at 335 Main Street, Charleston, S.C. 24901. The population data 118 may be based on geographic markets (e.g., according to Nielsen) and aggregated based on household and/or demographic attributes. For example, the population data 118 may include aggregated data, such as there being 500 households in the Charleston market with a male member aged 35-44 having an income of $25,001-$50,000. In some instances, the population data 118 may also provide limited viewing data associate with demographics, households, and/or constituents.

Figure 2:
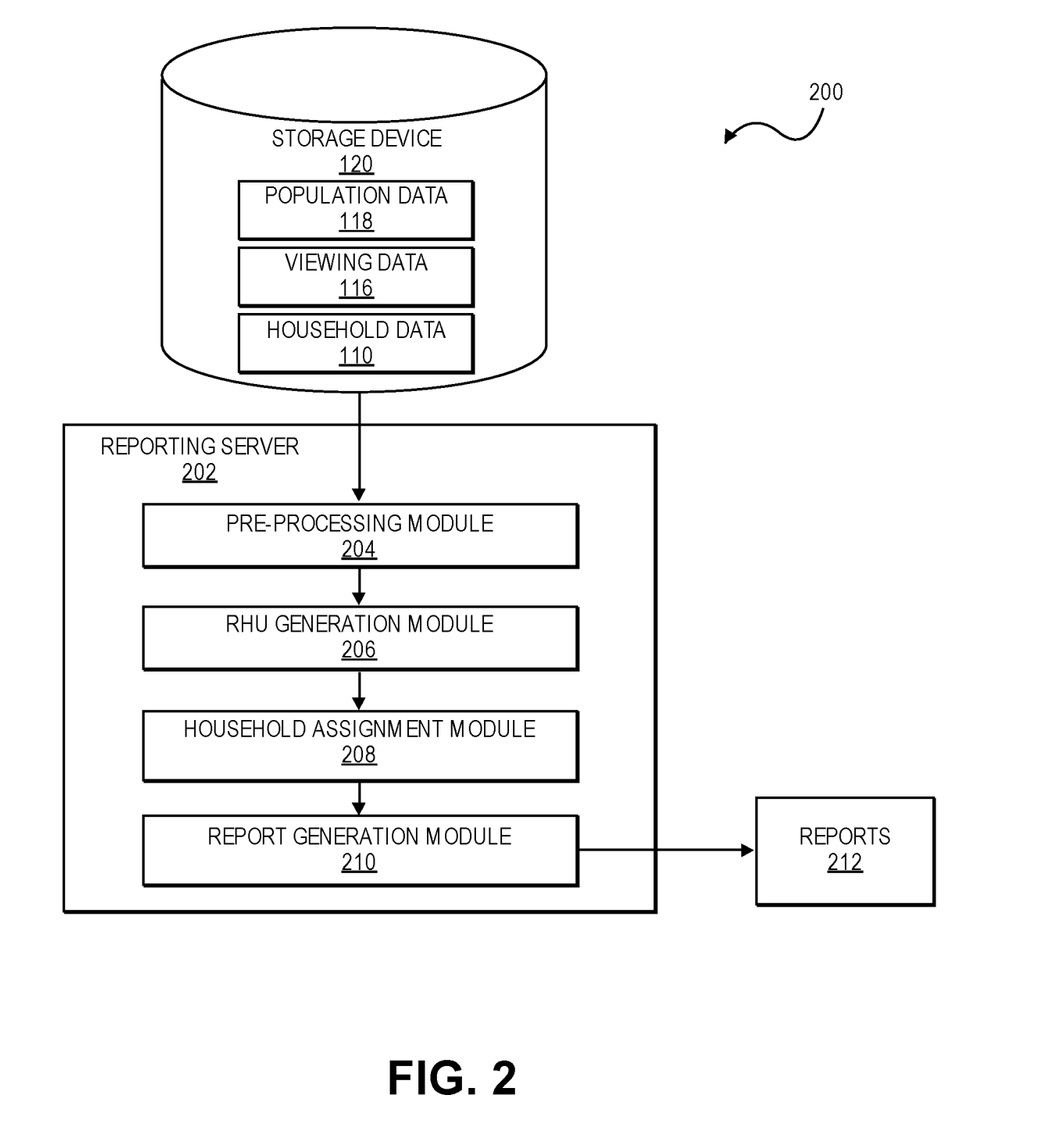
FIG. 2 illustrates an exemplary system in which household-level viewing data can be used to project market-level data through household assignment.

FIG. 2 illustrates an example of a system in which household-level viewing data may be used to generate projected market-level viewing data through demographic attribution. The system 200 includes a reporting server 202 embodied, for example, by a general-purpose computer capable of responding to and executing instructions in a defined manner, a personal computer, a special-purpose computer, a workstation, and/or a mobile device. The reporting server 202 may receive instructions from, for example, a software application, a program, a piece of code, a device, a computer, and/or a computer system, which independently or collectively direct operations. The instructions may be embodied permanently or temporarily in any type of machine, component, equipment, or other physical storage medium that is capable of being used by the reporting server 202.

The reporting server 202 may have a processor that executes instructions implemented by a pre-processing module 204, an RHU generation module 206, a household assignment module 208, and a report generation module 210. The reporting server 202 may be operable to process the panelist household data 110, panelist viewing data 116, and population data 118 to generate one or more reports 212 that include panelist viewing data 116.

Figure 3:
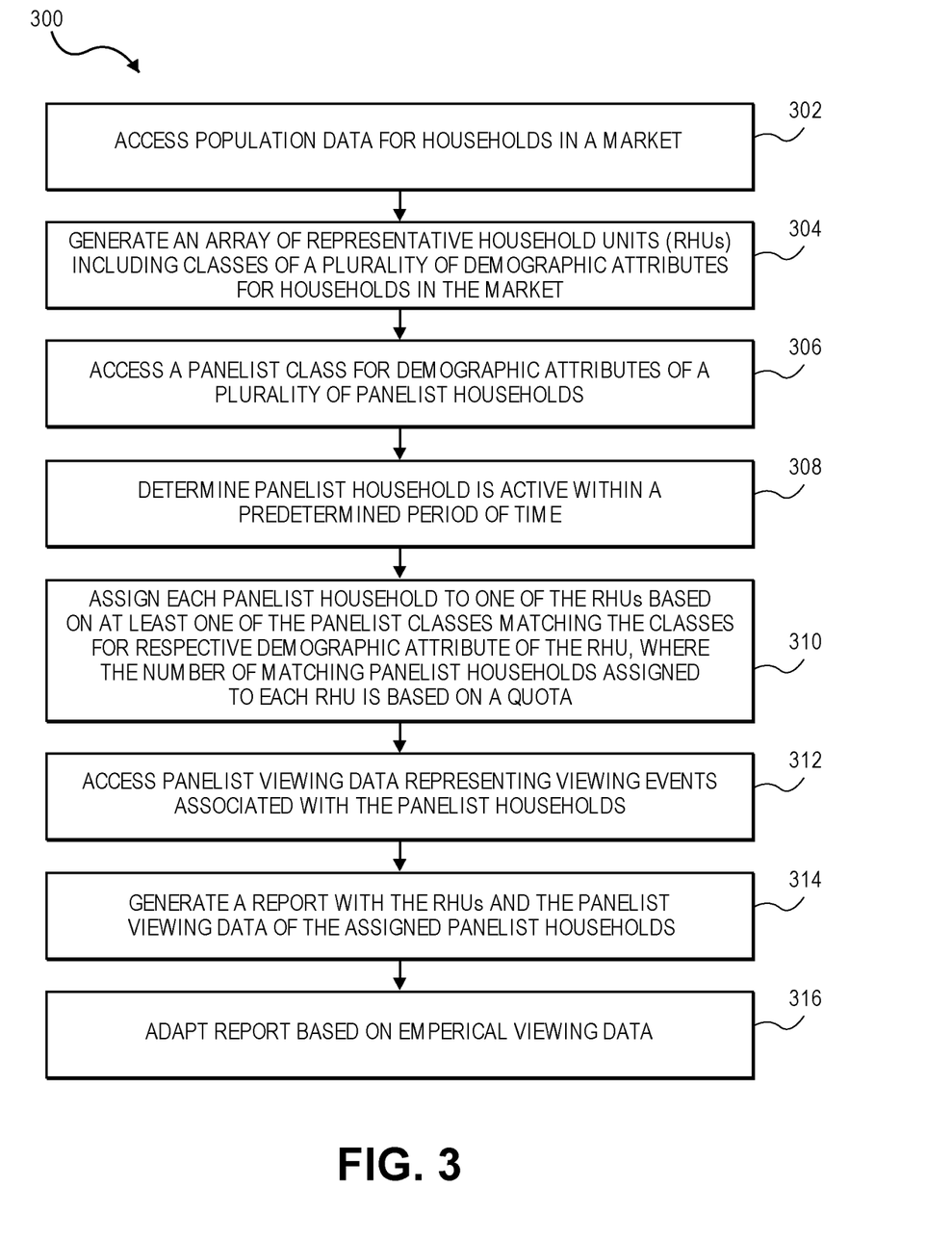
FIG. 3 is a flow chart illustrating an exemplary process for generating a report with market-level data projected from household-level viewing data.

FIG. 3 is a flow chart illustrating an exemplary process 300 for generating the reports 212. The following describes the process 300 as being performed by components of the reporting server 202 with respect to data associated with the panelist household 101. However, the process 300 may be performed by other systems or system configurations and implemented with respect to other members of the viewing audience.

At step 302, the pre-processing module 204 may access a portion of the collected data, including the population data 118. The pre-processing module 204 may perform one or more pre-processing functions on the population data 118 as appropriate. In some cases, the pre-processing module 204 may identify particular demographic attributes of the population data 118, such as age, gender, race, occupation, geographic area, and/or other elements associated with the population. In some cases, the pre-processing module 204 may sort the population data into particular demographic attributes based on the particular member 102 associated with each viewing event in the panelist viewing data 116. In some cases, the pre-processing module 204 may examine the distribution of the population data, and generate classes based on the one or more of household demographic attributes, member demographic attributes, and/or device demographic attributes. The household demographic attributes may include one or more of an income of the household, a language spoken in the household, a number of members of the household, and a number of children in the household. The member demographic attributes may include one or more of an age of at least one member of the household, a race of at least one member of the household, and an education level of at least one more of the household. The device demographic attributes may include one or more of a television stratum, a presence of a digital video recorder (DVR), and a number of panelist devices 112. The population data 118 may be received from the network 122 based on the geographic market (e.g., assigned by Nielsen), or alternatively, the pre-processing module 204 may categorize the households into markets based on an associated location, street, and/or address.

Figure 4:
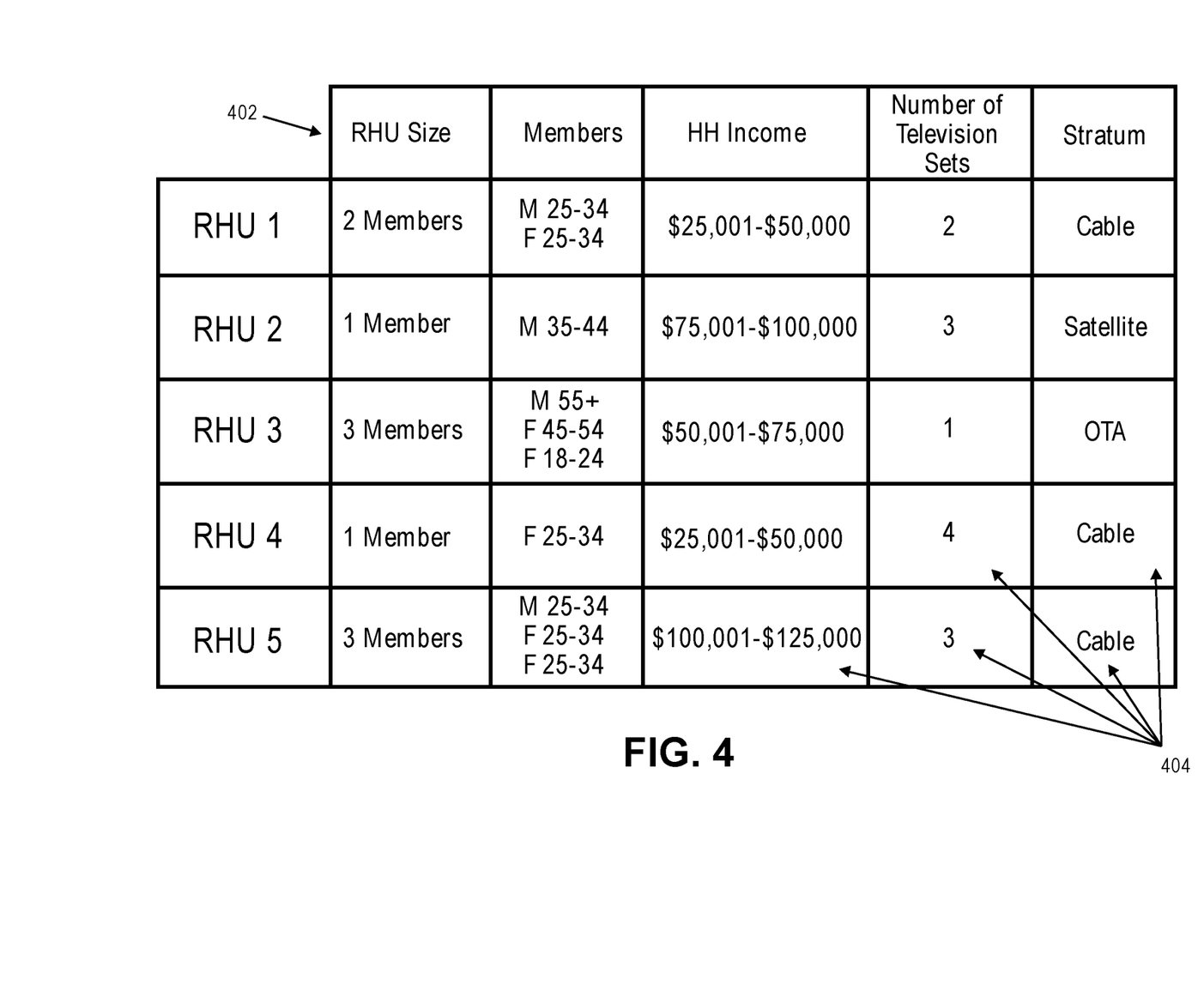
FIG. 4 illustrates a schematic illustrating an exemplary array of demographic attributes for Residential Household Units (RHUs).

At step 304, the RHU generation module 206 may generate an array of RHUs for each of the markets based on the population data. The RHUs may be generated based on any number of demographic attributes 402. As illustrated in FIG. 4, the demographic attributes 402 of the RHUs may include a number of members 102 in the household 101, a gender of the members 102, an income of the household 101, a number of television sets 112 of the household 101, and/or a television stratum. Each RHU may then be assigned classes 404 for each of the demographic attributes 402. The classes 404 may include a single value or a range of values for each of the demographic attributes 402. For example, the classes 404 with limited number of probable values (e.g., number of television sets and/or gender) may be based on a single value, but the classes 404 with a larger number of probably values (e.g., age and/or income) may be based on a range of values.

Figure 5:
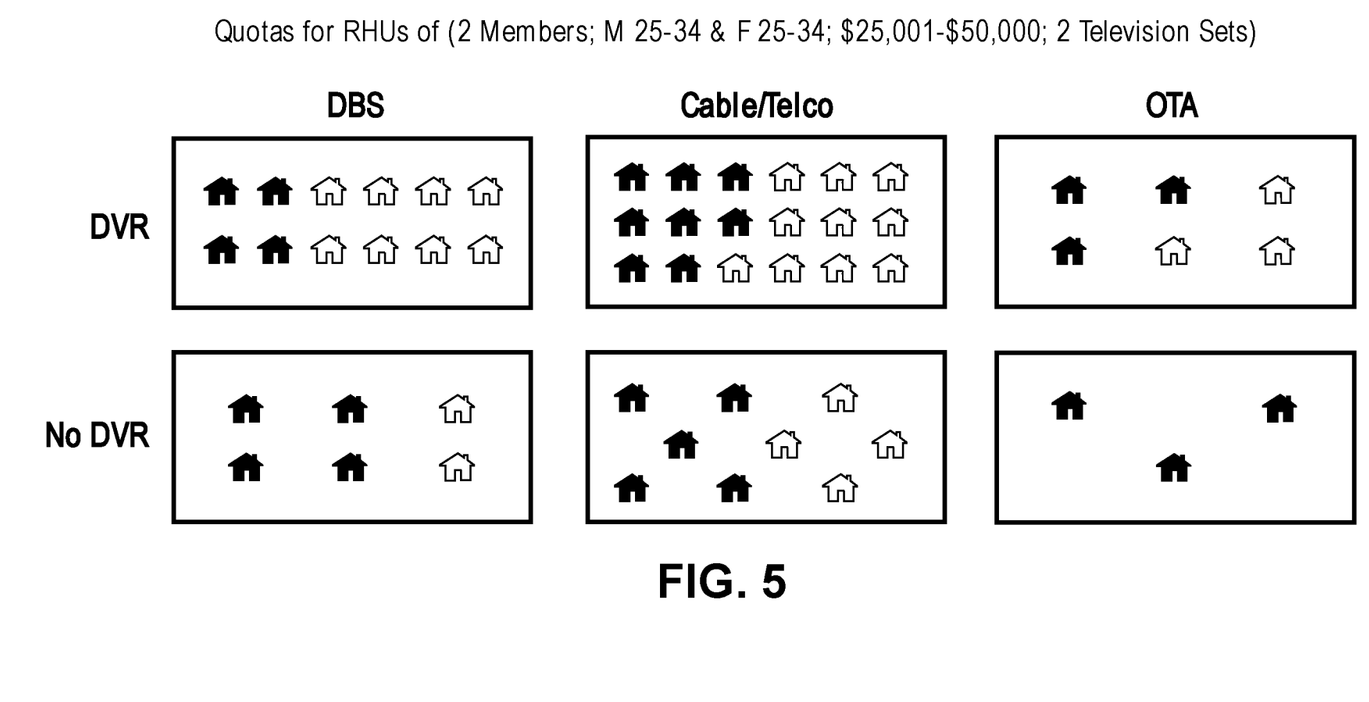
FIG. 5 illustrates a schematic illustrating quotas of a functional cross-section of RHUs.

The RHU generation module 206 may then generate a quota for each of the RHUs of the market. The quota may be a representative number of households in each RHU proportionally based on the distribution of demographic attributes in the population data 118. For example, FIG. 5 illustrates a functional cross-section of the RHUs having 2 members, a male between 25-34 years old, a female between 25-34 years old, a household income of $25,001-50,000, and 2 television sets. As further illustrated by the outlined images of houses, the number of panelist households to be assigned to the RHU with DBS and DVR is 12, the number assigned to the RHU with Cable/Telco and DVR is 18, and the number assigned to the RHU with OTA and DVR is 6. The number of panelist households to be assigned to the RHUs of DBS without DVR is 6, the number assigned to the RHU with Cable/Telco without DVR is 9, and the number assigned to the RHU with OTA without DVR is 3. The illustrated quotas for each of the RHUs is based on the relative proportion of the population falling within these classes. For example, as illustrated, the population data 118 may indicate that there are about twice as many households of (2 Members, M25-34 F25-34; $25,001-50,000; 2 television sets) with DBS that have a DVR than do not have a DVR. The illustrated quotas are also based on the population data 118 indicating that there are about two-thirds as many households of (2 Members, M25-34 F25-34; $25,001-50,000; 2 television sets) with DBS and a DVR than Cable/Telco and a DVR. The quotas would therefore proportionally reflect the demographics of the market as indicated in the population data 118.

At step 306, the household assignment module 208 may access the household data 110 for panelist classes for demographic attributes of a plurality of panelist households 101. As discussed herein, the classes may be collected directly from the panelist households 101 and stored in the storage device 120. The panelist household data 110 may include stored data of the panelist households 101, including classes for household demographic attributes, member demographic attributes, and/or device demographic attributes. The panelist household data 110 may also include an activity log for the panelist households based on the panelist viewing data 116. For example, the panelist household data 110 may indicate whether the panelist households 101 have been inactive within the 7, 30, or 60 days.

At step 308, the household assignment module 208 may determine that the panelist households 101 are active within a predetermined period of time. For example, the household assignment module 208 may modify a list of the panelist households of step 306 by deleting the panelist households without active viewing data within the past 30 days. Removing inactive panelist households 101 may avoid distortion of the panelist viewing data due to non-reporting and/or inactive panelist households 101.

At step 310, the household assignment module 208 may assign each panelist household 101 to one of the RHUs based on at least one of the panelist classes matching the classes for respective demographic attributes of the RHU. For example, as illustrated in FIG. 5, the household assignment module 208 may assign panelist households 101 (shown as filled in houses) based on the quota (shown as outlined houses). The household assignment module 208 may assign panelist households 101 to RHUs until the quota of the RHU is reached. As further illustrated in the exemplary flow chart of FIG. 6, the household assignment module 208 may assign first, second, and third panelist households 101 to one or more RHUs.

Figure 6:
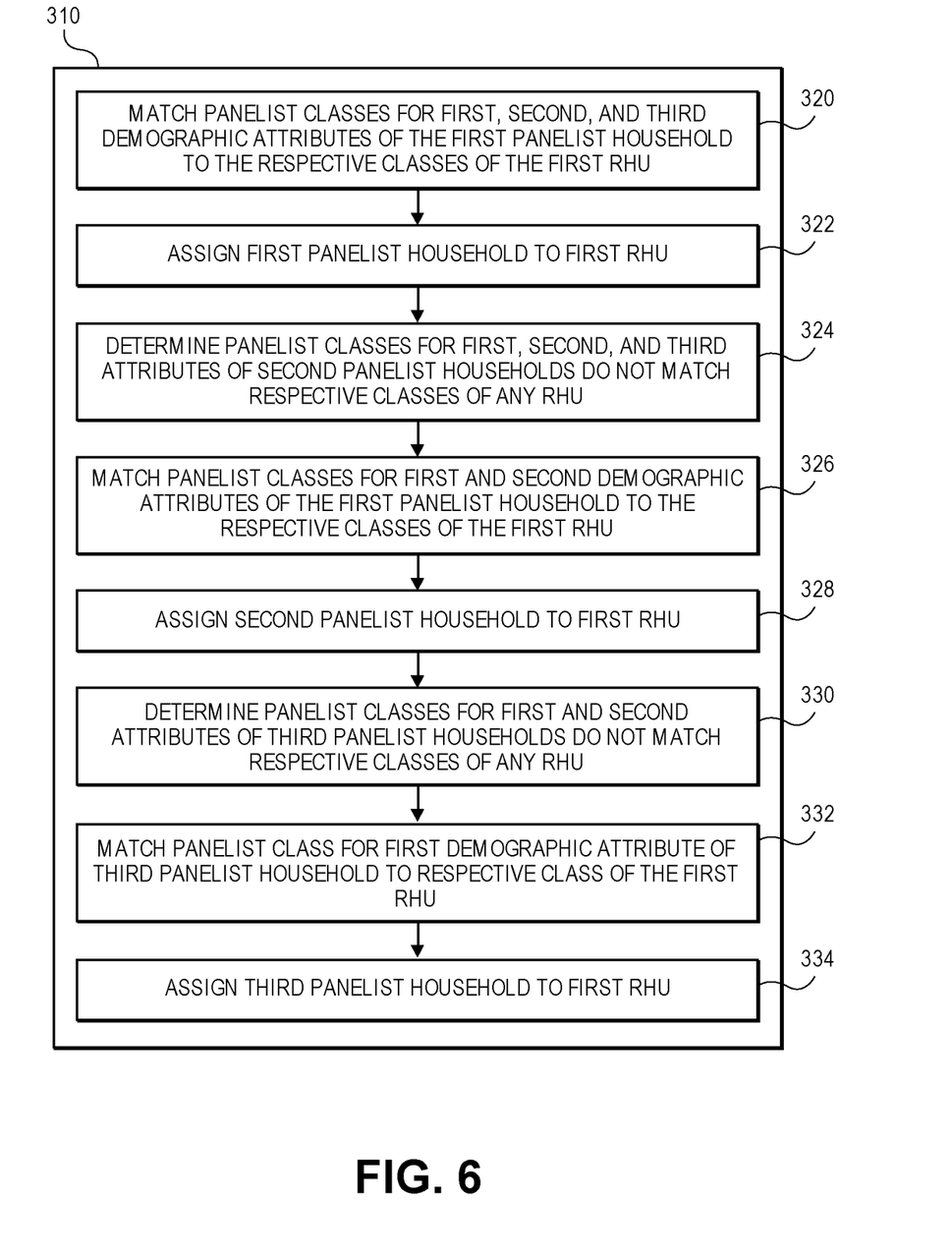
FIG. 6 is a flow chart illustrating an exemplary process for assigning panelist households to RHUs.

At step 320, the household assignment module 208 may match panelist classes for first, second, and third demographic attributes of the first panelist household 101 to respective classes of a first RHU. At step 322, the household assignment module 208 may assign the first panelist household to the first RHU based on the matching of the first, second, and third demographic attributes. For example, the panelists classes (e.g., 2 members, a male between 25-34 years old, and 2 television sets) of the first, second, and third demographic attributes for the first panelist household may match the respective classes (e.g., 2 members, a male between 25-34 years old, and 2 television sets) of the first RHU. Thus, the first panelist household 101 may be assigned to the first RHU.

At step 324, the household assignment module 208 may determine the panelist classes of the second panelist household do no match respective classes of any RHU for the first, second, and third demographic attributes. However, at step 326, the household assignment module 208 may match the panelist classes for the first and second demographic attributes of the second panelist households to respective classes of the first RHU. At step 328, the household assignment module 208 may assign the second panelist household to the first RHU. For example, the panelists classes (e.g., 2 members, a male between 25-34 years old, and 10 television sets) of the first, second, and third demographic attributes for the second panelist household does not match the respective classes for any RHU. However, the panelists classes (e.g., 2 members and a male between 25-34 years old) of the first and second demographic attributes for the second panelist household does match the respective classes for the first RHU. Thus the second panelist household is assigned to the first RHU.

At step 330, the household assignment module 208 may determine that panelist classes for the first and second demographic attributes of the third panelist household do not match respective classes of any RHU. The household assignment module 208 may match the panelist class for the first demographic of the third panelist household to the respective class of the first RHU. At step 334, the household assignment module 208 may assign the third panelist household to the first RHU. For example, the panelists classes (e.g., 2 members, a male between 96-100 years old) of the first and second demographic attributes for the third panelist household does not match the respective classes for any RHU. However, the panelists classes (e.g., 2 members) of the first demographic attribute for the third panelist household does match the respective classes for the first RHU. Thus, the second panelist household is assigned to the first RHU.

For example, the first demographic attribute may be a household attribute, such as one or more of an income of the household, a language spoken in the household, a number of members of the household, and a number of children in the household. The second demographic attribute may be a member attribute, such as one or more of an age of at least one member of the household, a gender of at least one member of the household, a race of at least one member of the household, an ethnicity of at least one of the household, and an education level of at least one member of the household. The third demographic attribute may be a device attribute, such as one or more of a number of panelist devices of the household, a television strata, and a presence of a digital video recorder (DVR).

Perfect matches of panelist households may be prioritized to provide a more accurate representation of the RHU. After determining the number of perfect matches (e.g., matching classes for the first, second, and third demographic attributes) is not sufficient to meet the quota of the RHU, the household assignment module 208 may selectively "relax" or disregard demographic attributes to assign the panelist households 101. Thus, one or more device demographic attributes (e.g., number of television sets in the panelist household 101) may be removed from consideration, as illustrated in steps 324-326. Then, if necessary, one or more member demographic attributes (e.g., the ethnicity of one of the members 102) may be disregarded, as illustrated in steps 330-332. Then one or more household demographic attributes (e.g., income of household 101) may potentially be removed from consideration.

Although FIG. 6 illustrates first, second, and third demographic attributes, the process 300 may include any number of demographic attributes. The process may include just the first and second demographic attributes. The process 300 may, additionally or alternatively, include a plurality of one or more of the first, second, and third demographic attributes. For example, the process 300 may include two first demographic attributes, two second demographic attributes, and two third demographic attributes, and proceed similar to steps 320-334, iteratively removing one of the third, second, and third demographic from consideration in order to assign the panelist households 101 to the RHUs. Although FIG. 6 illustrates the first, second, and third panelist households 101 being assigned to the first RHU, the panelist households 101 may be assigned in any arrangement. For example, the first panelist household 101 may be assigned to a third RHU in step 334. The second panelist household 101 may be assigned to a second RHU in step 328, and the third panelist household 101 may be assigned to the first RHU in the step 322.

The assignments of steps 320-334 may proceed until a quota for the RHUs are met. For example, the quota for RHU 1 may be met in step 322, when there are sufficient number of panelist households 101 with matching panelist classes for the first, second, and third demographic attributes. The assignment for RHU 1 would then stop due to the quota being met. However, the assignment for RHU 2 may proceed through steps 324-328, for example, when RHU 2 is not as well represented in the panelist households 101 as RHU 1. Steps 320-334 may be performed for each of the RHUs of the market in order to provide panelist household assignments that proportionally matches the demographic attributes of the market.

In some embodiments, the household assignment module 208 may duplicate matching panelist households 101 of an RHU based on the number of matching panelist households 101 assigned to the respective RHU being less than the quota. In this instance, the panelist households 101 with the best match to the respective RHU (e.g., the most matching classes) may be duplicated to provide an improved representation of the RHU. The duplication of the panelist households may ensure that the quota is met for each of the RHUs, while maintaining the demographic integrity of the RHUs.

At step 312, the report generation module 210 may access panelist viewing data 116 representing viewing events associated with the panelist households 101. At step 314, the report generation module 210 may generate viewership reports 212 with the RHUs and the panelist viewing data 116 of the assigned panelist households 101. The reports 212 may include data at any level of aggregation, and may be specified by a demographic attributes of the RHUs. The reports 212 may include the panelist viewing data 116 of various demographic groups as estimated through the use of demographic attribution. For example, a household-based report 212 may indicate that 10% of households that primarily speak Spanish watch soccer between 7 and 8 pm on Wednesday or 25% of households with at least one child watch Peppa Pig. A member-based report 212 may indicate that 8% households with at least one member having a Ph.D. watched PBS. A device-based report 212 may indicate that 20% of households without a DVR watch NBC during prime-time. The reports 212 based on the RHUs may include as many demographic attributes as desired. The reports 212 may provide accurate viewing data obtained directly from panel devices 112 in panelist households 101, accurately scaled based on the demographics of the market population.

The reports 212 may be displayed on a graphical user interface (GUI) on any type of device. The reports 212 may be generated from the data and displayed to provide an accurate measure of demographic-based viewing data for the overall market to the content providers, advertisers, and others. The reports 212 may therefore be used to estimate the number of viewing people and/or households of a particular demographic for a particular program, advertisement, sporting event, and/or other content item.

In some embodiments, the reports 212 of a market may be scaled relative to one or more other markets. For example, a first report 212 may be generated based on the New York City market and a second report 212 may be based on the Washington, D.C. market. The first and second reports 212 may be combined by scaling the reports 212 based on the relative overall population of the market and integrating. Thus, the first report 212 may be multiplied by a factor of the population of the New York City market relative to the Washington, D.C. market, and added to the second report 212 to combine the two markets.

At step 316, the report generation module 210 may adapt the reports 212 based on empirical viewing data. The reports 212 may be compared to the projected assigned viewing data to the individual platform targets, such as known viewing data for the market made available as either census totals or a combination of census and enumeration. The targets may provide a market data set with a high-confidence level for accuracy. As a result of the comparison, the report generation module may assign individual events into the appropriate RHUs to reach the targets of the known empirical data. The assigned individual events may be actual viewing events from the panelist viewing data 116, which were previously unassigned to an RHU. The adaption of step 316 may assure that the projected results of the reports 212 match individual-currency reported results of known empirical data.

Although specific examples using various equations of probability are described herein, the methods described herein can be used with a variety of probability and statistical techniques and are not limited to only the equations and examples shown.

The techniques described herein can be implemented in digital electronic circuitry, or in computer hardware, firmware, software, or in combinations of them. The techniques can be implemented as a computer program product, such as a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Process steps of the techniques can be performed by one or more programmable processors executing a computer program to perform functions of the techniques by operating on input data and generating output. Process steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of embodiments of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components.

What is claimed is:

1. A system, comprising:
a panelist device executing panelist software configured to monitor viewing events displayed on the panelist device for a panelist household and to generate panelist viewing data based on the monitored viewing events;
at least one processor; and
at least one memory storing instructions that, when executed, cause the at least one processor to:
access population data including classes of a plurality of demographic attributes for households in a market;
generate an array of representative household units (RHUs), wherein the RHUs are each assigned a class for each of the demographic attributes of the population data;
generate a quota for each RHU based on the number of households in the classes of demographic attributes of the RHU relative to the number of households in the market, wherein the RHUs are each assigned the respective quota;

access a panelist class for each of the demographic attributes of a plurality of panelist households;
assign the plurality of panelist households to the RHUs based on at least one of the panelist classes matching the classes for the respective demographic attributes of the RHU, wherein the number of matching panelist households assigned to each RHU is based on the quota;
stop assigning panelists households to each RHU based on the number of matching panelist households meeting the quota of the respective RHU;
access panelist viewing data representing viewing events associated with the plurality of panelist households; and
generate a report with the classes of the RHUs and the panelist viewing data of the assigned panelist households.

2. The system of claim 1, wherein assigning the plurality of panelist households to one of the RHUs is based on each of the panelist class matching the class for the respective demographic attributes of the RHU.

3. The system of claim 1, wherein the panelist viewing data includes a time duration of the viewing event and an identification of one or more of a displayed media, advertisement, website, app, network, and program.

4. The system of claim 1, wherein the viewing event occurs on one or more of a mobile phone, a tablet, a laptop computer, a desktop computer, smart appliances, and a smart watch.

5. The system of claim 1, wherein the demographic attributes include one or more of a television stratum, a presence of a digital video recorder (DVR), and a number of television sets.

6. The system of claim 1, wherein the demographic attributes include one or more of an age of at least one member of the household, a race of at least one member of the household, an ethnicity of at least one member of the household, and an education level of at least one member of the household.

7. The system of claim 1, wherein the demographic attributes include one or more of an income of the household, a language spoken in the household, a number of members of the household, and a number of children of the household.

8. The system of claim 1, wherein the instructions, when executed, further cause the at least one processor to determine that the plurality of panelist households are active based on viewing data accessed from a predetermined period of time, wherein only active panelist households are assigned to the RHUs.

9. The system of claim 1, wherein the instructions, when executed, further cause the at least one processor to duplicate panelist viewing data of the panelists households for an RHU based on the number of matching panelist households assigned to the RHU being less than the quota after the plurality of panelist households are assigned.

10. The system of claim 1, wherein the population data is received from at least one of a credit bureau and a census bureau.

11. The system of claim 1, wherein the instructions, when executed, further cause the at least one processor to:
receive a known value of viewing data for the market; and
adapt the panelist viewing data for at least one of the RHUs based on the known value of the viewing data.

12. The system of claim 1, wherein the instructions, when executed, further cause the at least one processor to:
receive second population data for at least one second market; and
scale the panelist viewing data for at least one of the RHUs of the market based on a relative size of the population data compared to the second population data.

13. A computer-implemented process, comprising:
monitoring, via panelist software executing on a panelist device, viewing events displayed on the panelist device for a panelist household and generating panelist viewing data based on the viewing events;
accessing population data including classes of a plurality of demographic attributes for households in a market;
generating an array of representative household units (RHUs), wherein the RHUs are each assigned a class for each of the demographic attributes of the population data;
generating a quota for each RHU based on the number of households in the classes of demographic attributes of the RHU relative to the number of households in the market, wherein the RHUs are each assigned the respective quota;
accessing a panelist class for each of the demographic attributes of a plurality of panelist households;
assigning the plurality of panelist households to the RHUs based on at least one of the panelist classes matching the classes for the respective demographic attributes of the RHU, wherein the number of matching panelist households assigned to each RHU is based on the quota;
stopping assigning panelists households to each RHU based on the number of matching panelist households meeting the quota of the respective RHU;
accessing panelist viewing data representing viewing events associated with the plurality of panelist households; and
generating a report with the classes of the RHUs and the panelist viewing data of the assigned panelist households.

14. The computer-implemented process of claim 13, wherein assigning the plurality of panelist households to one of the RHUs is based on each of the panelist class matching the class for the respective demographic attributes of the RHU.

15. A non-transitory computer-readable medium comprising computer-executable instructions which, when executed by at least one processor, cause the at least one processor to:
monitor, via panelist software executing on a panelist device, viewing events displayed on the panelist device for a panelist household and generate panelist viewing data based on the viewing events;
access population data including classes of a plurality of demographic attributes for households in a market;
generate an array of representative household units (RHUs), wherein the RHUs are each assigned a class for each of the demographic attributes of the population data;
generate a quota for each RHU based on the number of households in the classes of demographic attributes of the RHU relative to the number of households in the market, wherein the RHUs are each assigned the respective quota;
access a panelist class for each of the demographic attributes of a plurality of panelist households;
assign the plurality of panelist households to the RHUs based on at least one of the panelist classes matching the classes for the respective demographic attributes of the RHU, wherein the number of matching panelist households assigned to each RHU is based on the quota;

stop assigning panelists households to each RHU based on the number of matching panelist households meeting the quota of the respective RHU;

access panelist viewing data representing viewing events associated with the plurality of panelist households; and generate a report with the classes of the RHUs and the panelist viewing data of the assigned panelist households.

16. The computer-readable medium of claim 15, wherein assigning the plurality of panelist households to one of the RHUs is based on each of the panelist class matching the class for the respective demographic attributes of the RHU.

* * * * *